United States Patent
Probert et al.

(10) Patent No.: US 11,228,070 B2
(45) Date of Patent: Jan. 18, 2022

(54) EFFICIENT ELECTRIC ARCHITECTURAL LAYOUTS FOR ELECTRIFIED VEHICLES

(71) Applicant: FORD GLOBAL TECHNOLOGIES, LLC, Dearborn, MI (US)

(72) Inventors: Brad Warren Probert, Farmington Hills, MI (US); Luis Javier Sanchez, Lynnwood, WA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 121 days.

(21) Appl. No.: 16/679,424

(22) Filed: Nov. 11, 2019

(65) Prior Publication Data

US 2021/0143377 A1 May 13, 2021

(51) Int. Cl.
| | |
|---|---|
| *B60K 1/00* | (2006.01) |
| *H01M 50/20* | (2021.01) |
| *B60K 17/348* | (2006.01) |
| *B60L 58/26* | (2019.01) |
| *B60K 1/02* | (2006.01) |
| *B60K 1/04* | (2019.01) |
| *B60L 50/64* | (2019.01) |
| *H01M 50/24* | (2021.01) |
| *H01M 50/502* | (2021.01) |

(52) U.S. Cl.
CPC ............... *H01M 50/20* (2021.01); *B60K 1/02* (2013.01); *B60K 1/04* (2013.01); *B60K 17/348* (2013.01); *B60L 50/64* (2019.02); *B60L 58/26* (2019.02); *H01M 50/24* (2021.01); *H01M 50/502* (2021.01); *B60K 2001/0438* (2013.01); *H01M 2220/20* (2013.01)

(58) Field of Classification Search
CPC .. H01M 50/20; H01M 10/486; H01M 10/625; B60L 50/64; B60L 1/0003; B60L 15/20; B60L 88/21
See application file for complete search history.

(56) References Cited

U.S. PATENT DOCUMENTS

| | | | | |
|---|---|---|---|---|
| 7,504,178 B2* | 3/2009 | Shimamura | ......... | H01M 10/482 429/159 |
| 7,610,978 B2* | 11/2009 | Takasaki | ................ | B60L 50/64 180/68.5 |
| 7,927,728 B2* | 4/2011 | Ha | ........................ | H01M 50/20 429/61 |
| 9,029,000 B2* | 5/2015 | Han | .................... | H01M 10/486 429/123 |
| 9,360,529 B2* | 6/2016 | Seol | ................... | G01R 31/3842 |

(Continued)

Primary Examiner — Hau V Phan
(74) Attorney, Agent, or Firm — David B. Kelley; Carlson, Gaskey & Olds (57) ABSTRACT

This disclosure details exemplary electrical architectural layouts for distributing high voltage power within electrified vehicles. An exemplary battery pack associated with an electrical architectural layout of an electrified vehicle may include an enclosure assembly that houses one or more battery arrays. The battery arrays may be efficiently arranged relative to one another inside the enclosure assembly to establish an open channel within the enclosure assembly. A high voltage wiring harness may be routed through an interior of the battery pack within the open channel. The exemplary electrical architectural layouts of this disclosure may be employed within all-wheel drive, rear-wheel drive, or front-wheel drive electrified vehicles.

20 Claims, 6 Drawing Sheets

(56) References Cited

U.S. PATENT DOCUMENTS

| | | | |
|---|---|---|---|
| 9,511,660 B2 | 12/2016 | Braun et al. | |
| 2006/0102398 A1 | 5/2006 | Mizuno | |
| 2007/0059587 A1* | 3/2007 | Kishi | H01M 10/0568 |
| | | | 429/62 |
| 2011/0079454 A1 | 4/2011 | Maguire et al. | |
| 2012/0263988 A1* | 10/2012 | Obasih | H01M 10/613 |
| | | | 429/98 |
| 2014/0322568 A1* | 10/2014 | Sakai | H01M 10/425 |
| | | | 429/61 |
| 2014/0338999 A1* | 11/2014 | Fujii | H01M 50/20 |
| | | | 180/68.5 |
| 2015/0291019 A1* | 10/2015 | Hatta | B60L 1/003 |
| | | | 180/68.2 |
| 2016/0372805 A1* | 12/2016 | Kim | B60L 58/21 |
| 2017/0005371 A1* | 1/2017 | Chidester | B60L 15/20 |
| 2017/0012330 A1* | 1/2017 | Kim | H01M 10/625 |
| 2017/0054175 A1* | 2/2017 | Wallace | H01M 8/04208 |
| 2018/0013113 A1* | 1/2018 | Wuensche | H01M 10/6556 |
| 2018/0034117 A1* | 2/2018 | Bang | H01M 10/625 |
| 2018/0097265 A1* | 4/2018 | Tarlau | H01M 10/6567 |
| 2018/0294452 A1* | 10/2018 | Tan | H01M 10/6556 |
| 2019/0074561 A1* | 3/2019 | Schwarzer | H01M 10/6555 |
| 2019/0109357 A1* | 4/2019 | Kenney | H01M 10/6554 |
| 2019/0131674 A1* | 5/2019 | Lu | H01M 10/625 |
| 2019/0198951 A1* | 6/2019 | Tong | H01M 10/613 |
| 2019/0273227 A1* | 9/2019 | Zeng | H01M 2/1077 |

\* cited by examiner

EFFICIENT ELECTRIC ARCHITECTURAL LAYOUTS FOR ELECTRIFIED VEHICLES

TECHNICAL FIELD

This disclosure relates to electrified vehicles, and more particularly to efficient electric architectural layouts for packaging traction battery packs and other associated electrical equipment within electrified vehicles.

BACKGROUND

Electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage traction battery pack typically powers the electric machines and other high voltage devices of the electrified vehicle. In some electrified vehicles, such as all-wheel drive electrified vehicles, for example, the battery pack must supply power to both a front electric machine and a rear electric machine. High voltage wiring harnesses are typically routed around the outside of the battery pack and connect to an electrical junction box for distributing the power to the front and rear electric machines.

SUMMARY

A battery pack according to an exemplary aspect of the present disclosure includes, among other things, an enclosure assembly including a tray and a cover, a heat exchanger plate positioned against a floor of the tray, and a first row of battery arrays positioned in proximity to the heat exchanger plate. The first row of battery arrays includes a first battery array and a second battery array spaced apart from the first battery array, an open channel extending between the first battery array and the second battery array and between the cover and a section of the heat exchanger plate that is disposed between the first battery array and the second battery array, and a first high voltage wiring harness routed through the open channel and disposed completely inside the enclosure assembly.

In a further non-limiting embodiment of the foregoing battery pack, the first high voltage wiring harness extends from a first connector to a second connector of the enclosure assembly and extends along an entire length of the open channel.

In a further non-limiting embodiment of either of the foregoing battery packs, a second high voltage wiring harness is connected to the first connector and a third high voltage wiring harness is connected to the second connector. Neither the second high voltage wiring harness nor the third high voltage wiring harness is routed through the open channel.

In a further non-limiting embodiment of any of the foregoing battery packs, the enclosure assembly extends along a central longitudinal axis, and the central longitudinal axis bisects the open channel.

In a further non-limiting embodiment of any of the foregoing battery packs, a second heat exchanger plate is positioned against the floor of the tray, a second row of battery arrays is positioned in proximity to the second heat exchanger plate, and a battery internal structure is disposed between the first and second rows of battery arrays.

In a further non-limiting embodiment of any of the foregoing battery packs, a length of the open channel extends along a central longitudinal axis of the enclosure assembly, and the battery internal structure extends along an axis that is transverse to the central longitudinal axis.

In a further non-limiting embodiment of any of the foregoing battery packs, a third heat exchanger plate positioned against the floor of the tray, a third row of battery arrays positioned in proximity to the third heat exchanger plate, and a second battery internal structure disposed between the second and third rows of battery arrays.

In a further non-limiting embodiment of any of the foregoing battery packs, the battery internal structure is a rigid cross member that connects between a pair of longitudinally extending side walls of the tray.

In a further non-limiting embodiment of any of the foregoing battery packs, a battery internal wiring line is routed within the open channel.

In a further non-limiting embodiment of any of the foregoing battery packs, the first high voltage wiring harness is routed over top of the battery internal wiring line.

An electrified vehicle according to another exemplary aspect of the present disclosure includes, among other things, a battery pack, a first electric machine, a second electric machine, a first high voltage wiring harness routed completely inside the battery pack, a second high voltage wiring harness connecting the battery pack to the first electric machine, and a third high voltage wiring harness connecting the battery pack to the second electric machine.

In a further non-limiting embodiment of the foregoing electrified vehicle, the electrified vehicle is an all-wheel drive vehicle and the first electric machine is a first electric motor and the second electric machine is a second electric motor.

In a further non-limiting embodiment of either of the foregoing electrified vehicles, the electrified vehicle is a rear-wheel drive vehicle and the first electric machine is an electric motor and the second electric machine is an electrical generator.

In a further non-limiting embodiment of any of the foregoing electrified vehicles, the electrified vehicle is a front-wheel drive vehicle and the first electric machine is an electric motor and the second electric machine is an electrical generator.

In a further non-limiting embodiment of any of the foregoing electrified vehicles, the first high voltage wiring harness is routed through an open channel formed inside an enclosure assembly of the battery pack.

In a further non-limiting embodiment of any of the foregoing electrified vehicles, the battery pack includes a first connector and a second connector. The first high voltage wiring harness is connected to both the first connector and the second connector, the second high voltage wiring harness is connected to only the first connector, and the third high voltage wiring harness is connected to only the second connector.

In a further non-limiting embodiment of any of the foregoing electrified vehicles, the first high voltage wiring harness connects to the first and second connectors at a location inside the enclosure assembly, the second high voltage wiring harness connects to the first connector at a first location outside the enclosure assembly, and the third high voltage wiring harness connects to the second connector at a second location outside the enclosure assembly.

In a further non-limiting embodiment of any of the foregoing electrified vehicles, the open channel extends along a central longitudinal axis of the enclosure assembly.

In a further non-limiting embodiment of any of the foregoing electrified vehicles, the first electric machine is a first electric motor configured to power a first set of drive wheels and the second electric machine is a second electric motor configured to power a second set of drive wheels.

In a further non-limiting embodiment of any of the foregoing electrified vehicles, a battery internal wiring line is routed completely inside the battery pack.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary electrical architectural layouts for distributing high voltage power within electrified vehicles. An exemplary battery pack associated with an electrical architectural layout of an electrified vehicle may include an enclosure assembly that houses one or more battery arrays. The battery arrays may be efficiently arranged relative to one another inside the enclosure assembly to establish an open channel within the enclosure assembly. A high voltage wiring harness may be routed through an interior of the battery pack within the open channel. The exemplary electrical architectural layouts of this disclosure may be employed within all-wheel drive, rear-wheel drive, or front-wheel drive electrified vehicles. These and other features are discussed in greater detail in the following paragraphs of this detailed description.

Figure 1:
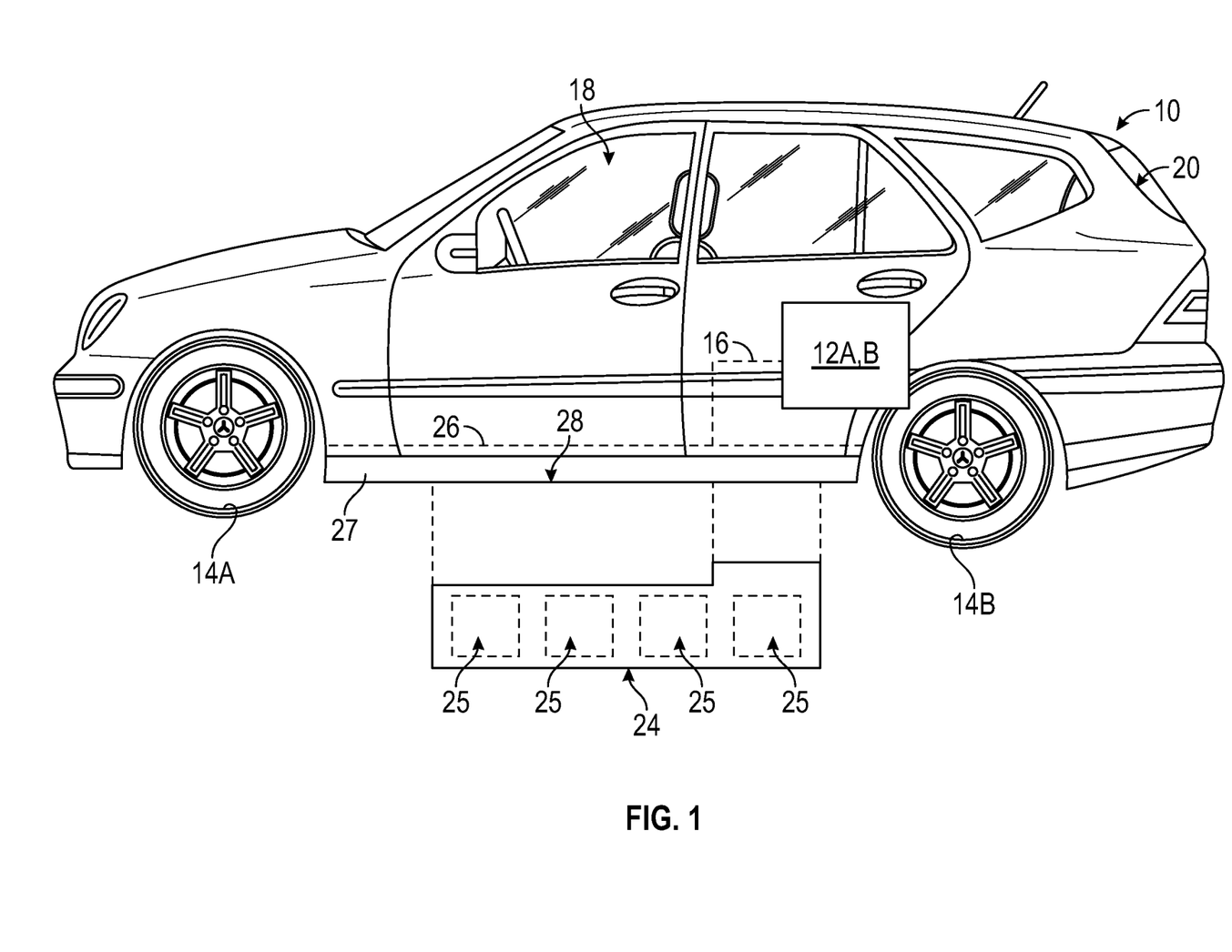
FIG. 1 schematically illustrates an electrified vehicle equipped with a high voltage traction battery pack.
Figure 2:
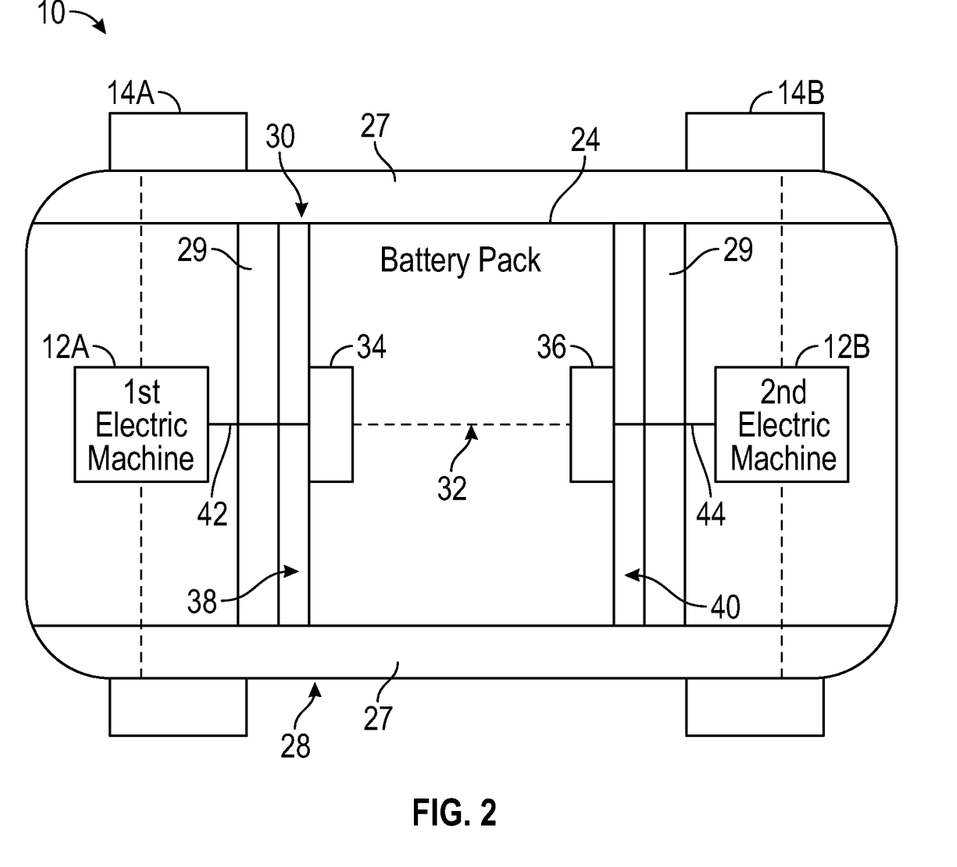
FIG. 2 illustrates an electrical architectural layout of the electrified vehicle of FIG. 1 according to an embodiment of this disclosure.

FIGS. 1 and 2 schematically illustrate an electrified vehicle 10. The electrified vehicle 10 could be a car, a truck, a van, a sport utility vehicle, a crossover, or any other type of vehicle that employs an electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEVs), fuel cell vehicles, etc. Therefore, although not specifically shown in this embodiment, the electrified vehicle 10 could be equipped with an internal combustion engine that can be employed either alone or in combination with other energy sources to propel the electrified vehicle 10.

Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component.

In the illustrated embodiment, the electrified vehicle 10 is a full electric vehicle propelled solely through electric power, such as by one or more electric machines 12A, 12B, without any assistance from an internal combustion engine. The electric machines 12A, 12B may operate as electric motors, electric generators, or both. The electric machines 12A, 12B receive electrical power and provides a rotational output torque to one or more drive wheels 14A, 14B of the electrified vehicle 10.

A voltage bus 16 electrically connects the electric machine(s) 12A, 12B to a battery pack 24. The battery pack 24 is an exemplary electrified vehicle traction battery. The battery pack 24 may be a high voltage traction battery pack that includes a plurality of battery arrays 25 (i.e., battery assemblies or groupings of rechargeable battery cells) capable of outputting electrical power to operate the electric machine 12 and/or other electrical loads of the electrified vehicle 10. Other types of energy storage devices and/or output devices can also be used to electrically power the electrified vehicle 10.

The battery pack 24 may be mounted at various locations of the electrified vehicle 10. In an embodiment, the electrified vehicle 10 includes a passenger cabin 18 and a cargo space 20 (e.g., a trunk) located to the rear of the passenger cabin 18. A floor pan 26 may separate the passenger cabin 18 from a vehicle frame 28, which generally establishes the vehicle underbody. The battery pack 24 may be suspended from or otherwise mounted to the vehicle frame 28 such that it is remote from both the passenger cabin 18 and the cargo space 20. The battery pack 24 therefore does not occupy space that would otherwise be available for carrying passengers or cargo.

The vehicle frame 28 may include a pair side rails 27 (sometimes referred to as "frame rails" or "beams") that are spaced apart from one another and extend longitudinally to establish a length of the sides of the vehicle frame 28. The vehicle frame 28 may additionally include a pair of cross members 29 (see FIG. 2) that laterally connect between the side rails 27 to establish a width of the vehicle frame 28. In an embodiment, the battery pack 24 is mounted within a space between the side rails 27 and the cross members 29. The battery pack 24 may be either directly or indirectly mounted to the side rails 27 and/or the cross members 29 using mechanical fasteners or any other suitable fastening technique.

In an embodiment, the electrified vehicle 10 is an all-wheel drive electrified vehicle that includes a first electric machine 12A (i.e., a first electric motor) for powering a front set of drive wheels 14A and a second electric machine 12B (i.e., a second electric motor) for powering a rear set of drive wheels 14B. The battery pack 24 must be connected to the first and second electric machines 12A, 12B in order to distribute electrical power to these high voltage devices for propelling the electrified vehicle 10.

FIG. 2 illustrates an exemplary electrical architectural layout 30 for electrically connecting the battery pack 24 to the first and second electric machines 12A, 12B. In an embodiment, the electrical architectural layout 30 utilizes a first high voltage wiring harnesses 32 that is disposed completely inside the battery pack 24. The first high voltage wiring harness 32 may extend between a first connector 34 and a second connector 36 of the battery pack 24. The first connector 34 and the second connector 36 may be disposed on opposite sides of the battery pack 24. In an embodiment, the first connector 34 is located on a front-facing side 38 of the battery pack 24, and the second connector 36 is located on a rear-facing side 40 of the battery pack 24.

The electrical architectural layout 30 may additionally utilize a second high voltage wiring harness 42 and a third high voltage wiring harness 44. The second high voltage wiring harness 42 may connect between the first electric machine 12A and the first connector 34 of the battery pack 24, and the third high voltage wiring harness 44 may connect between the second electric machine 12B and the second connector 36 of the battery pack 24. The second and third high voltage wiring harnesses 42, 44 may therefore extend outside of the battery pack 24. Once each of the first, second, and third high voltage wiring harnesses 32, 42, 44 are connected to the first connector 34 and/or the second connector 36, electrical power may be distributed from the battery pack 24 to each of the first and second electric machines 12A, 12B.

Each of the first, second, and third high voltage wiring harnesses 32, 42, and 44 may include one or more insulated copper wires. The insulated copper wires may extend between opposing connector housings that are configured to connect to the first and second connectors 34, 36 or to the connectors provided on the first and second electric machines 12A, 12B. The exact designs of the wiring harnesses of this disclosure are not intended to limit this disclosure.

Packaging the first high voltage wiring harness 32 inside the battery pack 24 eliminates the need for routing the wiring outside of the battery pack 24 and further eliminates the need for using an electrical junction box in order to distribute the power to the first and second electric machines 12A, 12B. The interior packaging of the first high voltage wiring harness 32 may additionally obviate the need to use relatively expensive electromagnetic wire shielding on or within the first high voltage wiring harness 32. The electrical architectural layout 30 therefore provides a more efficient design that reduces weight and costs associated with the electrified vehicle 10.

Figure 3:
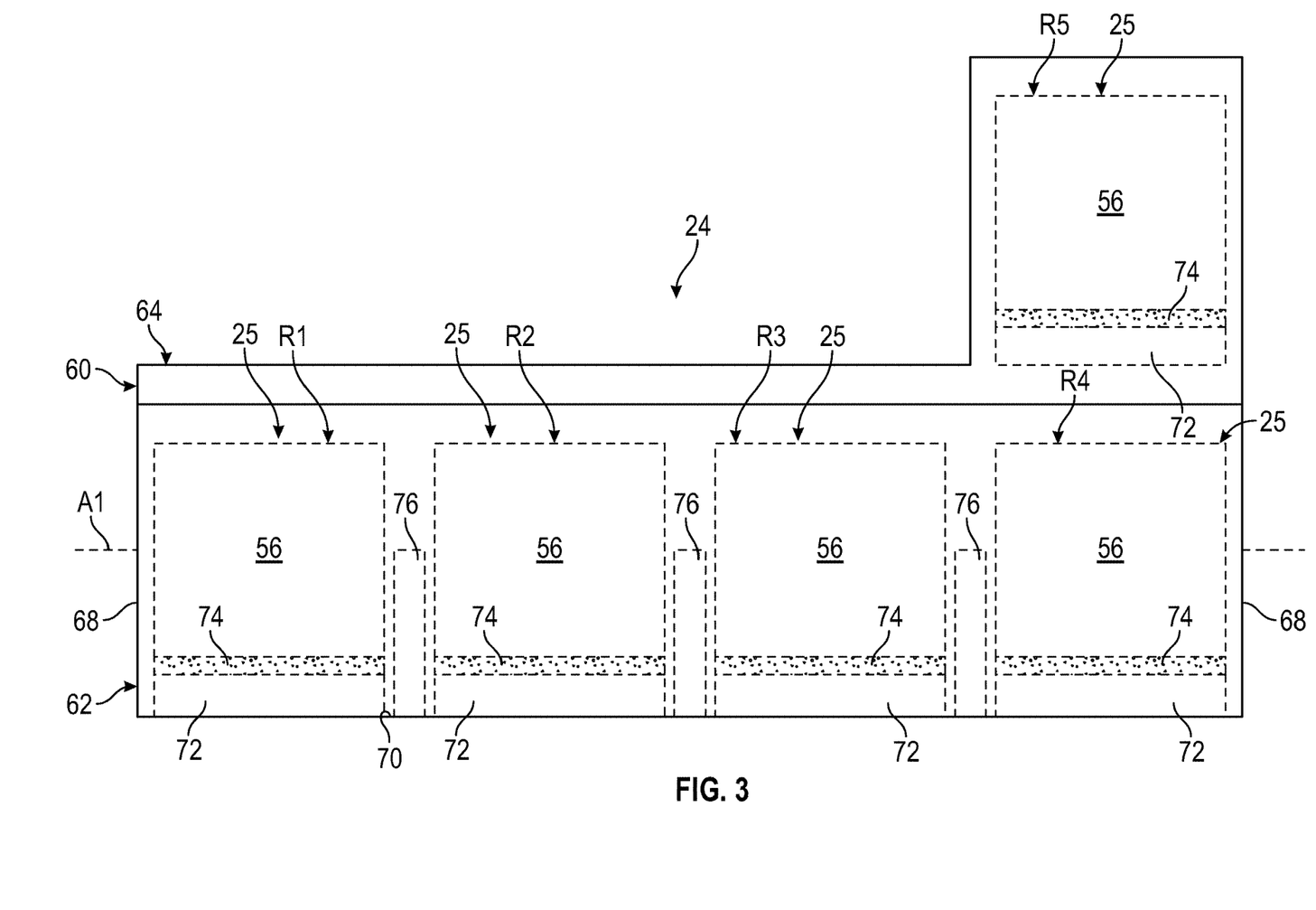
FIG. 3 schematically illustrates a battery pack associated with the electrical architectural layout of FIG. 2.
Figure 4:
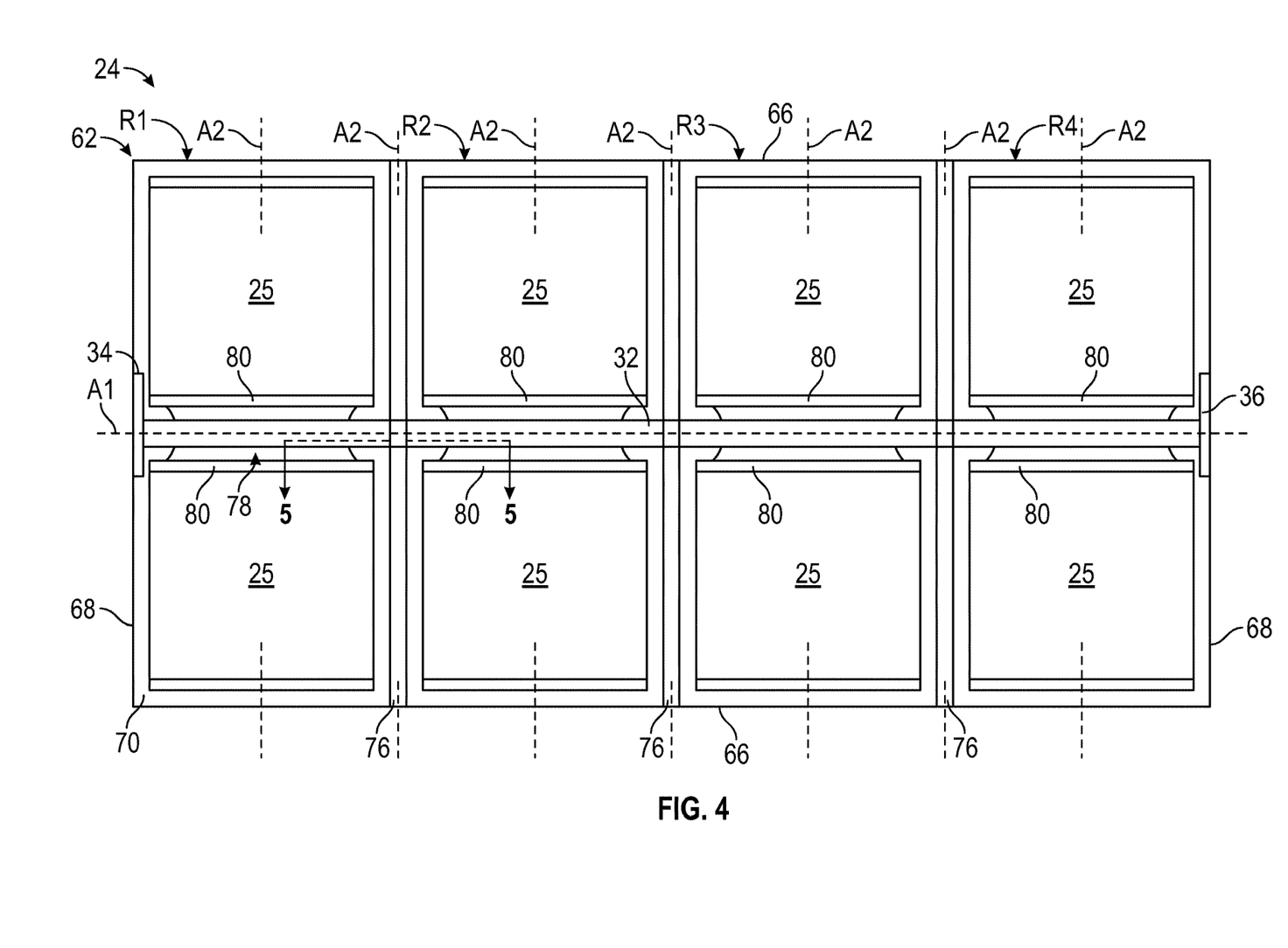
FIG. 4 is a top view of the battery pack of FIG. 3. Select portions of the battery pack are removed in order to better illustrate an interior of the battery pack.

FIGS. 3 and 4 illustrate a battery pack 24 that can be employed within an electrified vehicle, such as the electrified vehicle 10 of FIGS. 1-2. A highly schematic front view of the battery pack 24 is shown in FIG. 3, and a top view of the battery pack 24 is shown in FIG. 4. Portions (e.g., a cover 64) of the battery pack 24 are removed in FIG. 4 in order to better visualize its internal contents and configuration.

The battery pack 24 may house a plurality of battery cells 56 that store energy for powering various electrical loads of the electrified vehicle 12. The battery pack 24 could employ any number of battery cells 56 within the scope of this disclosure. Accordingly, this disclosure is not limited to the exact configuration shown in FIGS. 2-3.

The battery cells 56 may be stacked side-by-side along one or more stack axes to construct groupings of battery cells 56, sometimes referred to as "cell stacks" or "cell arrays." In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56 of each grouping, along with any support structures (e.g., array frames, spacers, rails, walls, plates, bindings, etc.), may collectively be referred to as a battery assembly or a battery array 25. The battery pack 24 depicted in FIGS. 3-4 includes four rows (labeled as rows R1, R2, R3, and R4) of two laterally adjacent battery arrays 25 for a total of eight battery arrays 25. An additional row R5 (i.e., a second tier) of two adjacent battery arrays 25 may be stacked on top of at least one of the rows R1-R4 (as illustrated, row R5 is stacked on top of row R4) for a total of ten battery arrays 25. However, the battery pack 24 could include a greater or fewer number of battery arrays and still fall within the scope of this disclosure.

An enclosure assembly 60 may house each battery array 25 of the battery pack 24. The enclosure assembly 60 may extend along a central longitudinal axis A1 and may include a tray 62 and a cover 64. The enclosure assembly 60 may include any size, shape, and configuration within the scope of this disclosure.

The tray 62 may include a pair of longitudinally extending side walls 66, a pair of laterally extending side walls 68, and a floor 70 disposed between the pair of longitudinally extending side walls 66 and the pair of laterally extending side walls 68. The longitudinally extending side walls 66 may extend in parallel with the central longitudinal axis A1, and the laterally extending side walls 68 may extend generally perpendicular to the central longitudinal axis A1. When mounted to the electrified vehicle 10, the longitudinally extending side walls 66 of the tray 62 extend in parallel with a front-to-rear length of the electrified vehicle 12, and the laterally extending side walls 68 extend in parallel with cross-width of the electrified vehicle 12.

In an embodiment, the enclosure assembly 60 is a sealed enclosure. For example, during assembly, the battery arrays 25 may be arranged relative to one another within the tray 62, and the cover 64 may then be fixedly secured to the tray 62 to seal the battery arrays 25 therein.

Each row R1-R5 of battery arrays 25 may include a heat exchanger plate 72, which is sometimes referred to as a cold plate or cold plate assembly. Therefore, in an exemplary embodiment, the two battery arrays 25 of each row R1-R5 share a common heat exchanger plate 72. The battery arrays 25 of each row R1-R5 may be positioned relative to the heat exchanger plate 72 such that the battery cells 56 are either in direct contact with or in close proximity to their respective heat exchanger plate 72. In an embodiment, the heat exchanger plates 72 are positioned against the floor 70 of the tray 62, and the battery arrays 25 are positioned on top of the heat exchanger plates 72.

In another embodiment, a thermal interface material (TIM) 74 (schematically shown in FIG. 3) may optionally be positioned between the battery arrays 25 and the heat exchanger plates 72 such that exposed surfaces of the battery cells 56 are in direct contact with the TIM 74. The TIM 74 maintains thermal contact between the battery cells 56 and the heat exchanger plates 72, thereby increasing the thermal conductivity between these neighboring components during heat transfer events. The TIM 74 may be made of any known thermally conductive material. In an embodiment, the TIM 74 includes an epoxy resin. In another embodiment, the TIM 74 includes a silicone based material. Other materials, including but not limited to thermal greases, may alternatively or additionally make up the TIM 74.

The heat exchanger plates 72 may be part of a liquid cooling system that is configured for thermally managing the battery cells 56 of each battery array 25. For example, heat may be generated and released by the battery cells 56 during charging operations, discharging operations, extreme ambient conditions, or other conditions. It may be desirable to remove the heat from the battery arrays 25 to improve capacity, life, and performance of the battery cells 56. The heat exchanger plates 72 are configured to conduct the heat out of the battery cells 56. In other words, the heat exchanger plates 72 may operate as heat sinks for removing heat from the heat sources (i.e., the battery cells 56). The heat exchanger plates 72 could alternatively be employed to heat the battery cells 56, such as during extremely cold ambient conditions.

A battery internal structure 76, such as a relatively rigid cross member, may be positioned between each adjacent row of battery arrays 25. In general, the battery internal structures 76 add rigidity to the battery pack 24.

In an embodiment, one battery internal structure 76 is disposed between the rows R1 and R2 of battery arrays 25, another battery internal structure 76 is disposed between the rows R2 and R3, and yet another battery internal structure 76 is disposed between the rows R3 and R4 for a total of three battery internal structures 76 provided within the enclosure assembly 60. However, the total number of battery internal structures 76 provided inside the enclosure assembly 60 is not intended to limit this disclosure.

The battery internal structures 76 may connect between the longitudinally extending side walls 66 of the tray 62 and therefore are arranged, in the illustrated embodiment, in a cross-vehicle orientation. In an embodiment, both the battery arrays 25 and the battery internal structures 76 extend along axes A2 (see FIG. 4) that are generally perpendicular to the central longitudinal axis A1 of the enclosure assembly 60.

The adjacent battery arrays 25 of reach row R1-R4 may be spaced apart from one another to establish an open channel 78 that extends along a center of the tray 62. The open channel 78 may extend horizontally between end plates 80 of the adjacent battery arrays 25 and may extend vertically between upper surfaces 82 of the heat exchanger plates 72 and an internal surface 84 of the cover 64 (see, e.g., FIG. 5). In an embodiment, the open channel 78 extends along the central longitudinal axis A1 such that a centerline axis of the open channel 78 is coincident with the central longitudinal axis A1. In another embodiment, the central longitudinal axis A1 bisects the open channel 78. Portions of the battery internal structures 76 may extend within the open channel 78 but do not completely block the open channel 78 because these structures are shorter than the battery arrays 25.

Figure 5:
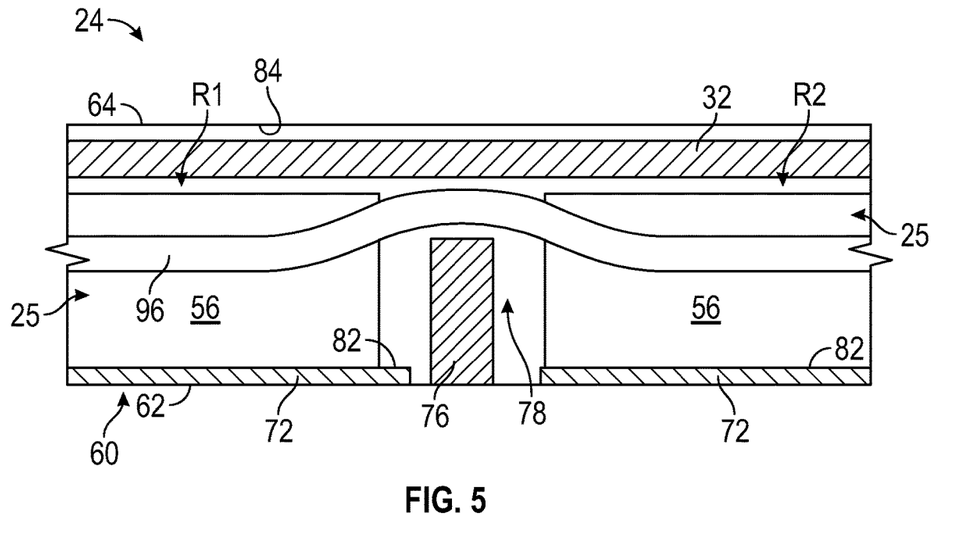
FIG. 5 is a cross-sectional view through section 5-5 of FIG. 4.

Referring now primarily to FIGS. 4 and 5, the first high voltage wiring harness 32 can be routed through the open channel 78 in order to better utilize this free space for increasing the overall packaging efficiency of the battery pack 24. The first high voltage wiring harness 32 may extend from the first connector 34 to the second connector 36 of the battery pack 24 and may therefore be routed across an entire length of the open channel 78. Since the first high voltage wiring harness 32 is packaged completely inside the enclosure assembly 60, wire shielding is not required as the enclosure assembly 60 can provide any necessary electromagnetic noise protection.

As best shown in FIG. 5, one or more additional wiring lines 96 may also be routed within the open channel 78. The total number of wiring lines 96 that are routed within the open channel 78 are not intended to limit this disclosure. The wiring lines 96 may include any type of battery wiring. In an embodiment, the wiring lines 96 are battery internal wiring lines that are connected to a battery energy control module and/or a battery electronic controller for monitoring the health of the battery cells 56 of the battery arrays 25.

The first high voltage wiring harness 32 may be routed within a portion of the open channel 78 that extends between upper surfaces of the battery arrays 25 and the internal surface 84 of the cover 64 of the enclosure assembly 60. In an embodiment, the first high voltage wiring harness 32 is routed over top of the wiring lines 96. However, an opposite configuration is also contemplated in which the first high voltage wiring harness 32 is routed below the wiring lines 96 within the scope of this disclosure.

Figure 6:
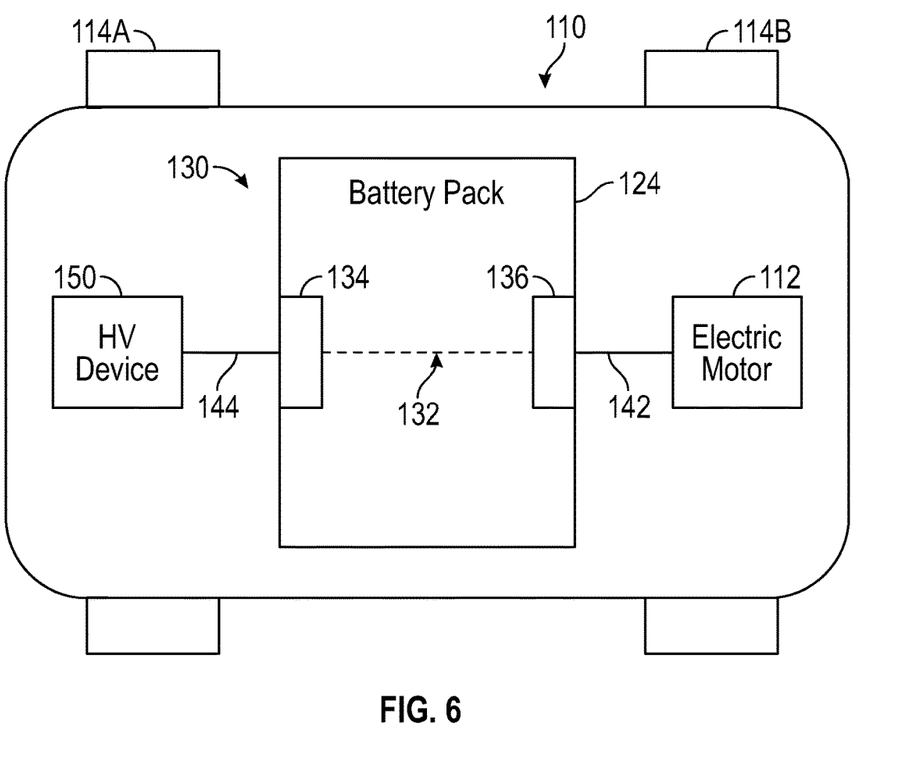
FIG. 6 illustrates an electrical architectural layout of an electrified vehicle according to another embodiment of this disclosure.

FIG. 6 illustrates an electrical architectural layout 130 of another electrified vehicle 110. In this embodiment, the electrified vehicle 110 is rear-wheel drive electrified vehicle that includes an electric motor 112 for powering a rear set of drive wheels 114B and another high voltage device 150 (e.g., an electrical generator) that may be packaged within the electrified vehicle 110, such as under the vehicle hood. A battery pack 124 of the electrified vehicle 110 must be connected to the electric motor 112 and the high voltage device 150 in order to distribute electrical power to these devices.

In an embodiment, the electrical architectural layout 130 utilizes a first high voltage wiring harnesses 132 that is disposed completely inside the battery pack 124. The first high voltage wiring harness 132 may extend between a first connector 134 and a second connector 136 of the battery pack 124.

The electrical architectural layout 130 may additionally utilize a second high voltage wiring harness 142 and a third high voltage wiring harness 144. The second high voltage wiring harness 142 may connect between the electric motor 112 and the second connector 136 of the battery pack 124, and the third high voltage wiring harness 144 may connect between the high voltage device 150 and the first connector 134 of the battery pack 124. The second and third high voltage wiring harnesses 142, 144 may therefore extend outside of the battery pack 124. Once each of the first, second, and third high voltage wiring harnesses 132, 142, 144 are connected to the first connector 134 and/or the second connector 136, electrical power may be distributed from the battery pack 124 to each of the electric motor 112 and the high voltage device 150.

Packaging the first high voltage wiring harness 132 inside the battery pack 124 eliminates the need for routing the wiring outside of the battery pack 124 and further eliminates the need for using an electrical junction box in order to distribute the power to the electric motor 112 and the high voltage device 150. The interior packaging of the first high voltage wiring harness 132 may additionally obviate the need for relatively expensive electromagnetic wire shielding to be utilized on the first high voltage wiring harness 132. The electrical architectural layout 130 therefore provides a more efficient design that reduces weight and costs associated with the electrified vehicle 110.

Figure 7:
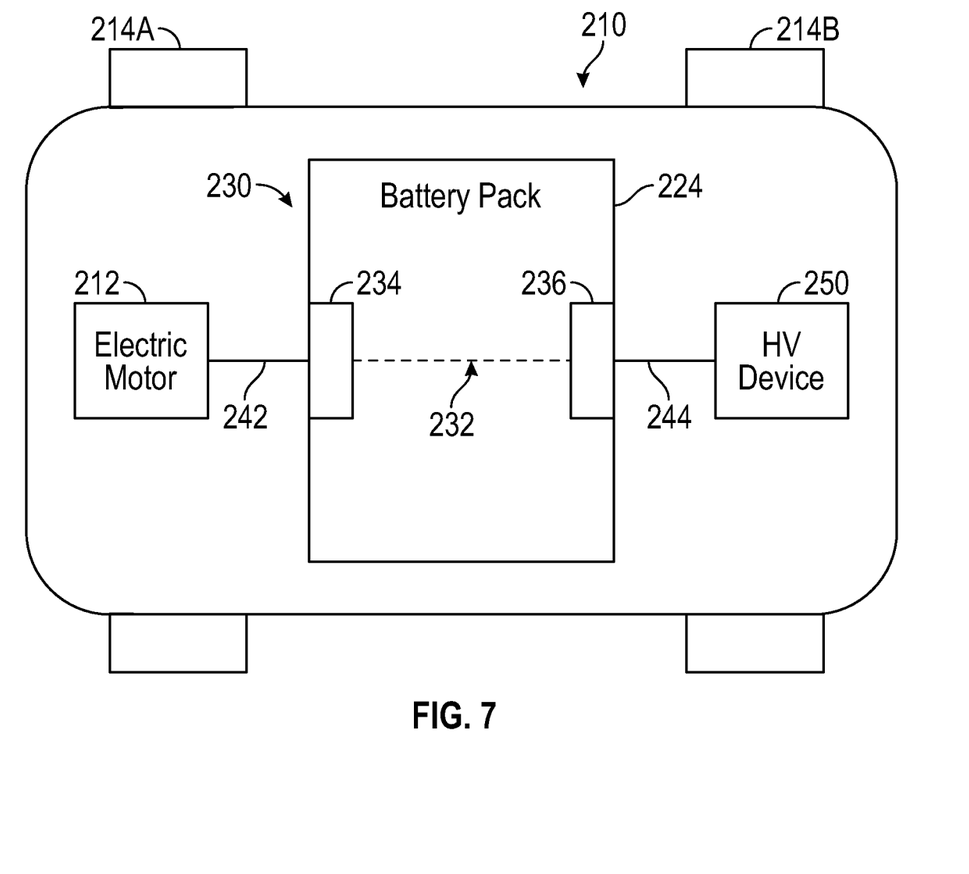
FIG. 7 illustrates an electrical architectural layout of an electrified vehicle according to yet another embodiment of this disclosure.

FIG. 7 illustrates an electrical architectural layout 230 of yet another electrified vehicle 210. In this embodiment, the electrified vehicle 210 is front-wheel drive electrified vehicle that includes an electric motor 212 for powering a front set of drive wheels 214A and another high voltage device 250 (e.g., an electrical generator) that may be packaged within the electrified vehicle 210, such within a rear cargo space of the electrified vehicle 210. A battery pack 224 of the electrified vehicle 210 must be connected to the electric motor 212 and the high voltage device 250 in order to distribute electrical power to these devices.

In an embodiment, the electrical architectural layout 230 utilizes a first high voltage wiring harnesses 232 that is disposed completely inside the battery pack 224. The first high voltage wiring harness 232 may extend between a first connector 234 and a second connector 236 of the battery pack 224.

The electrical architectural layout 230 may additionally utilize a second high voltage wiring harness 242 and a third high voltage wiring harness 244. The second high voltage wiring harness 242 may connect between the electric motor 212 and the first connector 234 of the battery pack 224, and the third high voltage wiring harness 244 may connect between the high voltage device 250 and the second connector 236 of the battery pack 224. The second and third high voltage wiring harnesses 242, 244 may therefore extend outside of the battery pack 224. Once each of the first, second, and third high voltage wiring harnesses 232, 242, 244 are connected to the first connector 234 and/or the second connector 236, electrical power may be distributed from the battery pack 224 to each of the electric motor 212 and the high voltage device 250.

Packaging the first high voltage wiring harness 232 inside the battery pack 224 eliminates the need for routing the wiring outside of the battery pack 224 and further eliminates the need for using an electrical junction box in order to distribute the power to the electric motor 212 and the high voltage device 250. The interior packaging of the first high voltage wiring harness 232 may additionally obviate the need for relatively expensive electromagnetic wire shielding to be utilized on the first high voltage wiring harness 232. The electrical architectural layout 230 therefore provides a more efficient design that reduces weight and costs associated with the electrified vehicle 210.

The exemplary electrified vehicles of this disclosure incorporate efficient electrical architectural layouts for maximizing overall vehicle packaging efficiencies. The efficient electrical architectural layouts employ wiring harnesses that are routed inside rather than outside the battery pack, thereby eliminating the need for expensive components such as wire shielding and electrical junction boxes. The efficient electrical layouts reduce weight and costs associated with the electrified vehicle, thereby resulting in improved electrified vehicle performance and customer satisfaction.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
an enclosure assembly including a tray and a cover;
a heat exchanger plate positioned against a floor of the tray;
a first row of battery arrays positioned in proximity to the heat exchanger plate,
wherein the first row of battery arrays includes a first battery array and a second battery array spaced apart from the first battery array;
an open channel extending between the first battery array and the second battery array and between the cover and a section of the heat exchanger plate that is disposed between the first battery array and the second battery array; and
a first high voltage wiring harness routed through the open channel and disposed completely inside the enclosure assembly.

2. The battery pack as recited in claim 1, wherein the first high voltage wiring harness extends from a first connector to a second connector of the enclosure assembly and extends along an entire length of the open channel.

3. The battery pack as recited in claim 2, comprising a second high voltage wiring harness connected to the first connector and a third high voltage wiring harness connected to the second connector, wherein neither the second high voltage wiring harness nor the third high voltage wiring harness is routed through the open channel.

4. The battery pack as recited in claim 1, wherein the enclosure assembly extends along a central longitudinal axis, and the central longitudinal axis bisects the open channel.

5. The battery pack as recited in claim 1, comprising:
a second heat exchanger plate positioned against the floor of the tray;
a second row of battery arrays positioned in proximity to the second heat exchanger plate; and
a battery internal structure disposed between the first and second rows of battery arrays.

6. The battery pack as recited in claim 5, wherein a length of the open channel extends along a central longitudinal axis of the enclosure assembly, and the battery internal structure extends along an axis that is transverse to the central longitudinal axis.

7. The battery pack as recited in claim 5, comprising:
a third heat exchanger plate positioned against the floor of the tray;
a third row of battery arrays positioned in proximity to the third heat exchanger plate; and
a second battery internal structure disposed between the second and third rows of battery arrays.

8. The battery pack as recited in claim 5, wherein the battery internal structure is a rigid cross member that connects between a pair of longitudinally extending side walls of the tray.

9. The battery pack as recited in claim 1, comprising a battery internal wiring line routed within the open channel.

10. The battery pack as recited in claim 9, wherein the first high voltage wiring harness is routed over top of the battery internal wiring line.

11. An electrified vehicle, comprising:
the battery pack of claim 1;
a first electric machine;
a second electric machine;
the first high voltage wiring harness routed completely inside the battery pack;
a second high voltage wiring harness connecting the battery pack to the first electric machine; and a third high voltage wiring harness connecting the battery pack to the second electric machine.

12. The electrified vehicle as recited in claim 11, wherein the electrified vehicle is an all-wheel drive vehicle and the first electric machine is a first electric motor and the second electric machine is a second electric motor.

13. The electrified vehicle as recited in claim 11, wherein the electrified vehicle is a rear-wheel drive vehicle and the first electric machine is an electric motor and the second electric machine is an electrical generator.

14. The electrified vehicle as recited in claim 11, wherein the electrified vehicle is a front-wheel drive vehicle and the first electric machine is an electric motor and the second electric machine is an electrical generator.

15. The electrified vehicle as recited in claim 11, wherein the first high voltage wiring harness is routed through the open channel formed inside the enclosure assembly of the battery pack, and further wherein the battery pack includes a first connector and a second connector, wherein the first high voltage wiring harness is connected to both the first connector and the second connector, the second high voltage wiring harness is connected to only the first connector, and the third high voltage wiring harness is connected to only the second connector.

16. The electrified vehicle as recited in claim 15, wherein the first high voltage wiring harness connects to the first and second connectors at a location inside the enclosure assembly, the second high voltage wiring harness connects to the first connector at a first location outside the enclosure assembly, and the third high voltage wiring harness connects to the second connector at a second location outside the enclosure assembly.

17. The electrified vehicle as recited in claim 15, wherein the open channel extends along a central longitudinal axis of the enclosure assembly.

18. The electrified vehicle as recited in claim 11, wherein the first electric machine is a first electric motor configured to power a first set of drive wheels and the second electric machine is a second electric motor configured to power a second set of drive wheels.

19. The electrified vehicle as recited in claim 11, comprising a battery internal wiring line routed completely inside the battery pack.

20. A battery pack, comprising:
an enclosure assembly including a tray and a cover;
a heat exchanger plate positioned against a floor of the tray;
a first row of battery arrays positioned in proximity to the heat exchanger plate and including a first battery array and a second battery array spaced apart from the first battery array,
wherein both the first battery array and the second battery array are positioned to be thermally managed by the heat exchanger plate;
an open channel extending between a first end plate of the first battery array and a second end plate of the second battery array and between an internal surface of the cover and an upper surface of the heat exchanger plate that is disposed between the first battery array and the second battery array,
wherein the open channel extends along a centerline axis that is coincident with a central longitudinal axis of the enclosure assembly;
a battery internal wiring line routed within the open channel; and
a high voltage wiring harness routed within the open channel at a location that is over top of the battery internal wiring line.

* * * * *